INVENTOR
RICHARD H. SMITH
BY: A H Oldham
ATTORNEY

3,496,290
BOOTSTRAP CORRELATION UTILIZING A DUAL SECTION ELECTRON IMAGE STORAGE TUBE
Richard H. Smith, North Canton, Ohio, assignor to Goodyear Aerospace Corporation, Akron, Ohio, a corporation of Delaware
Filed June 27, 1966, Ser. No. 560,505
Int. Cl. H04n 5/30
U.S. Cl. 178—7.85                                  5 Claims

ABSTRACT OF THE DISCLOSURE

This invention relates to an image matching system, and more particularly to a dual section electron image correlation tube whereby a bootstrap technique on image correlation may be appropriately utilized to permit rapid updating of the reference scene to eliminate scale factor and perspective errors when the system is used in a map matching operation.

---

Figure 1:
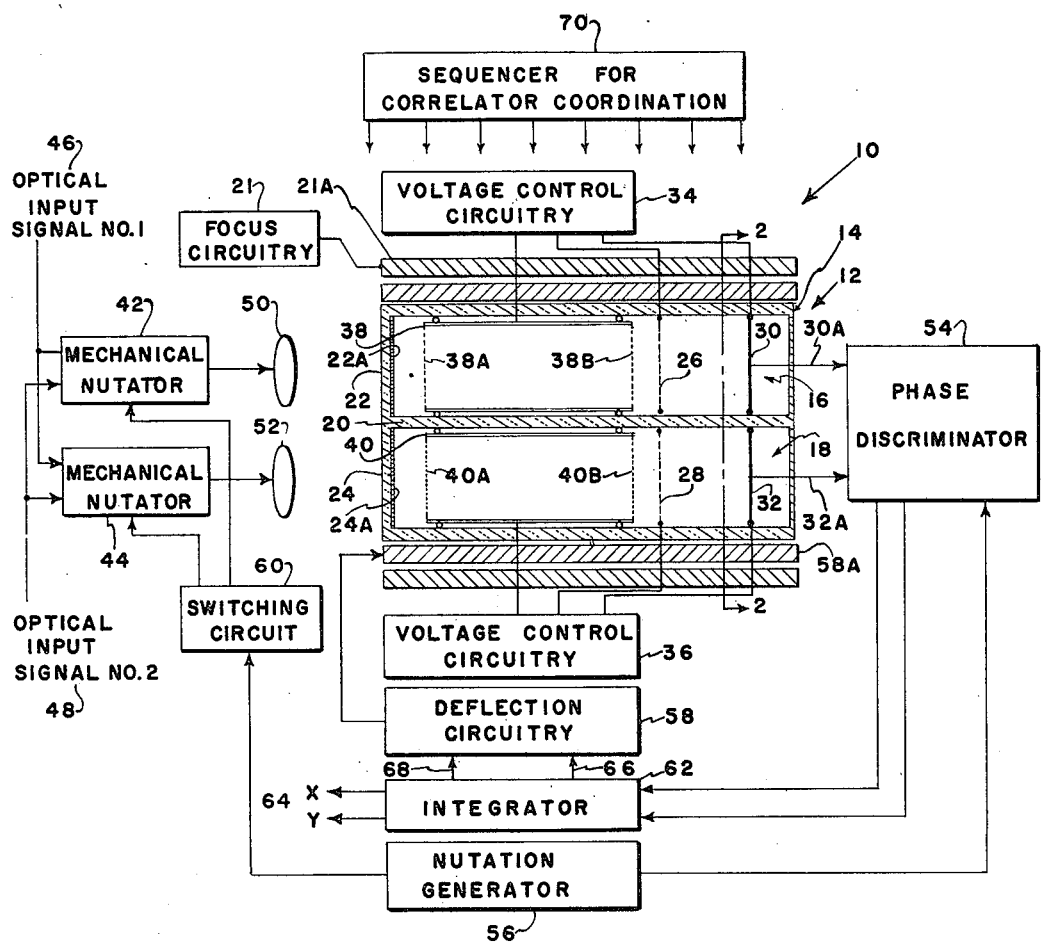

Heretofore, the art of image correlation has been set forth in such systems as shown in U.S. Patents Nos. 3,102,260 and 3,054,999 which are generally referred to as "map matching" systems. However, these systems require complex circuits and separate image storage apparatus to effect the comparison and achieve the correlation function. In other words, the reference image and the present image for comparison are not area-correlated in a single tube with a minimum of circuitry. There have been attempts to provide a correlation in a single tube, and certain apparatus to achieve such techniques are disclosed in U.S. Patent 3,194,511 and patent applications Ser. No. 232,961, now U.S. Patent 3,290,546 and 424,439, now U.S. Patent 3,424,937—all of which are assigned to the Goodyear Aerospace Corporation. However, these correlator tubes are not adaptable to a rapid updating of information since after each correlation is completed, the tube must be completely cleared of previous information with subsequent information then written in to facilitate a future correlation thereof. Thus, simultaneous correlation and read-in of a new reference scene for subsequent correlation is not possible. Where there are large scale changes, or perspective angle changes in a very short period of time, which may be associated in an unmanned aircraft of some type flying at a righ rate of speed relative to the earth's surface, or at some angle thereto, a system which permits rapid updating of the reference scene to eliminate scale factor and perspective or aspect angle changes is needed by the art.

Therefore, it is the general object of the present invention to avoid and overcome the foregoing and other difficulties of and objections to prior art practices by providing a simplified, improved, relatively inexpensive image matching system available within a dual section electronic image tube to provide a bootstrap type correlation technique, which will be operable with high efficiency and speed.

Another object of the invention is to provide a dual section electron image correlation tube which permits a new optical image to be stored while the system is correlating with a previounly stored image whereby when the tube is utilized in a map matching system rapid updating of the reference scene is accomplished to eliminate scale factor and aspect angle error changes.

A further object of the invention is to provide a dual section electron image correlation tube where nutation necessary to achieve correlation is accomplished externally of the tube before the optical input information is presented thereto.

The aforesaid objects of the invention and other objects which will become apparent as the description proceeds are achieved by providing in an image correlation apparatus the combination of an electron image correlation tube which may receive two separate optical inputs and effect storage thereof as electron image patterns, means to present subsequent optical inputs to the tube, means to selectively correlate the subsequently presented optical inputs with the desired stored electron image pattern to provide correlation signals, means to selectively erase the stored electron image patterns, and means to control the correlation, storage and erase of the electron image patterns whereby one pattern is correlated while the other is being erased and a new pattern stored.

Figure 2:
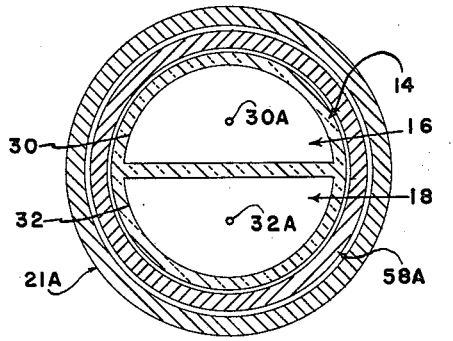

For a better understanding of the invention reference should be had to the accompanying drawings wherein:

FIGURE 1 is a schematic illustration of the preferred embodiment of the image matching system of the invention; and FIGURE 2 is an enlarged cross sectional view of the dual section electron image correlation tube.

The art of image correlation or "map matching" generally involves providing a reference image of certain section of the earth's terrain. This reference image may be from previous prepared film information, or previously obtained optical information which has appropriately been stored for future use. Then, a subsequent image of substantially the same area of the terrain, hereinafter called the present image, is matched or correlated with the reference image. In this manner, an unmanned aircraft can fly predetermined flight paths governed by previously prepared reference image information.

With reference to the drawings, there is shown in FIGURE 1, an image matching system which is indicated generally by numeral 10. The heart of the system is a special electron tube, hereinafter called a dual section electron image correlation tube, and indicated generally by numeral 12. The tube 12 consists of a single housing 14 which is normally cylindrically shaped and divided into two semi-cylindrically shaped compartments or sections 16 and 18 by a dividing wall 20. The housing 14 has transparent end sections 22 and 24 on one end thereof which have photoemissive cathode surfaces 22A and 24A, associated internally thereof, as indicated. The image storage elements of the tube 12 comprise separate storage grids 26 and 28 positioned in spaced parallel relationship from the photo cathode surfaces 22A and 24A, respectively. Each section 16 and 18 also has a collector electrode 30 and 32 mounted therein in substantially spaced parallel relationship from the grids 26 and 28, respectively. A focus circuit 21 controls a focus yoke or coil 21A to effect focus of all the electrons emitted from the respective photo cathode surfaces 22A and 24A onto the respective grids 26 and 28.

In the usual manner, as more particularly pointed out in the above-identified patent applications, correlation is achieved when a reference scene is stored on the storage grid and correlated with an active or present scene which is imaged on the photo cathode surface. Scene storage is accomplished by imaging an optical scene on the photo cathode which produces a photoelectron image. Then, with the photo cathode held negative the emitted electrons are transferred to the storage grid where a charge pattern is built up as a result of secondary emission. Correlation is performed by subsequently imaging a present or active scene on the photo cathode with the resulting photoelectron image directed onto the storage grid. With the storage grid then transmission modulated as a function of the previous scene, the number of electrons that flow through the storage grid when the present or active scene, in the form of an electron map is focused on it, is a measure of the correlation function. These transmitted electrons are collected by the respective collector electrodes. It is necessary to displace or nutate the active or present image information relative to the stored reference information to achieve such matching or correlating function. Also, according to the usual manner and error signal is generated by phase discriminating the outputs detected by the collector electrodes. This error signal may be integrated and utilized to control the deflection of the active image thus providing closed-loop operation and high response and accuracy.

Therefore, with this general description in mind, one can see that the tube 12 combines essentially two image correlation tubes in side by side relationship within a single envelope. Suitable voltage control circuitry 34 and 36 may be associated with each section 16 and 18 respectively, to control the voltage potentials between the photo cathodes, the storage grids, and the collector electrodes. Also, in accordance with the above-identified applications, each section 16 and 18 may have an appropriate drift tube 38 and 40 positioned between the respective photo cathode and storage grids. The primary purpose of these drift tubes is to provide ease of deflection of the present information as the electrons representing such information pass at a low and substantially uniform velocity along the length of such drift tubes. In the usual manner, each drift tube 38 and 40 is provided with field meshes 38 and 40A mounted adjacent the respective photo cathodes and secondary emission collector meshes 38 and 40B mounted adjacent the storage grids, resceptively. Normally, the drift tubes 38 and 40 will only be utilized if it is desirable to achieve deflection within the tube 12.

It is believed that a more desirable way to achieve the proper correlation will be to effect nutation of the present or active scene information externally of the tube 12 whereby a continuous closed-loop operation to provide guidance signals and image motion compensation may be achieved on one section during a storage or write function on the other section since the electron image that is stored or written onto the respective grid would not be influenced by the magnetic field necessary for nutation. Thus, to this end, the invention contemplates that appropriate mechanical nutators 42 and 44 may be associated with the respective sections 16 and 18 of the tube 12, as indicated. The nutator 42 is adapted to receive a first optical input signal 46 while the nutator 44 will receive a second optical input signal 48. Appropriate lenses 50 and 52 are associated with the respective nutators 42 and 44 to properly image the optical information onto the respective photo cathodes 22A and 24A. Mechanical nutations which rotate an angled lens are well known in the art. However, any technique to obtain external nutation will meet the objects of the invention.

A closed loop correlation system or circuit is achieved by electrically taking off the current information received on the respective collector electrodes 30 and 32 by suitable wire take offs 30A and 32A, respectively and feeding these inputs into a phase discriminator 54. Of course, the phase discriminator 54 has an appropriate input from a nutation generator 56 which provides signals to the nutators 42 and 44. Naturally, the ouputs from the phase discriminator 54 may be appropriately integrated by an integrator 62 to derive X and Y error signals 64, while at the same time providing correction or closed loop information over lines 66 and 68 respectively for the deflection circuitry 58 which provide displacements of the electron image so that the reference and line scenes are maintained in register.

A sequencer 70 acts to coordinate the voltage control circuitry 34 and the operation of the mechanical nutators 42 and 44 through a nutation switching circuit 60. The sequencer provides the necessary voltages to the dual section electron image correlation tube at appropriate times for storage, correlation and erasure. It also switches the nutators and controls the appropriate outputs of the tube to the phase discriminator. The deflection coil 58A, driven by the circuitry 58, compensates for aircraft movements to provide image motion compensation during correlation. Further since the same image information is passed through the non-functioning mechanical nutator, and the fact that the coil 58A controls deflection in both sections 16 and 18, present information is stored on one storage grid with image motion compensation while correlation is taking place on the other grid. The image motion compensation on the storage of the present image information provides a longer exposure time thus giving enhanced resolution and the ability to store a very low light level image. Further, the fact that the present image is stored while correlation takes place in the other section allows an immediate switching to begin correlation thereof. There is no time delay to switching correlation.

Thus, in operation, it should be understood that the sequence will occur substantially as follows:

(1) A reference optical input signal 1, indicated by numeral 46 will be sent through the nutator 42 which is in active at this time and subsequently stored as a charge pattern onto the appropriate grid 26 by properly applying voltages in the known manner.

(2) A present optical input signal 1, again indicated by numeral 46, will be sent through the nutators 42 and 44 with the nutation switching circuit 60 appropriately directing the nutation signal to nutator 42. The image will pass straight through nutator 44. Thus, the nutated optical signal will be focused by lens 50 onto the photo cathode 22A, thereby converted to a nutated electronic image, focused by coil 21A, and deflected by coil 58A over the already stored reference image on grid 26. The number of electrons passing through grid 26, as explained above, will represent the correlation signal. These electrons will be detected by the collector electrode 30, for proper phase discrimination, integration and closing the loops, as also more fully described above.

(3) When it is desired to store a second reference scene on storage grid 28, the reference image is sent through nutator 44, which is inactive at this time, and focusd on photocathode 24A. The resultant electron image is directed on storage grid 28 and stored as described above. During this storing operation, the electron image is under the influence of the same magnetic field that is holding the live scene in registration with the scene stored on grid 26. In most cases, the reference scene stored on grid 28 is the live scene that is being correlated with the reference scene stored on grid 26. If there is any motion or displacement of the live scene, the correlation signal obtained from section 16 will cause the deflection of the electron image thus providing a fixed electron image at storage grid 26. Since the image stored on grid 28 is the same image that is being correlated and stabilized in the alternate section, it follows that the image being stored is also stabilized since both electron images are influenced by the same magnetic deflection field. Thus, image motion compensation is applied to the scene being stored thereby permitting long storage times without loss of resolution due to image smear. This stored scene then becomes the second reference image.

(4) Immediately upon completion of correlation of the first image pattern stored on grid 26, a present optical input signal 2, indicated by numeral 48, will then be nutated as it passes through nutator 44, because of appropriate switching in the circuit 60 to achieve, in the usual manner, a correlation signal on the collector electrode 32. Naturally, this correlation signal will not be sent into the phase discriminator 54 until the first correlation in section 16 has been completed. At the same time however, the signal 2 is sent straight through nutator 42 for storage with image motion compensation on grid 26 to become in effect reference image 3 upon the next correlation.

(5) The sequences 1 and 2 above will then be repeated in section 16 of the tube 12 so that in essence new and up-to-date information is always being stored while the older information is being correlated. In this manner, rapid updating of the reference scene may be accomplished to eliminate scale factor, perspective, and aspect angle error changes.

Naturally, the appropriate voltage control circuitry 34 and 36 and sequencer 70 must be operated to insure coordination with the respective correlation or storage function of their particular section at that time. Since the grids 26 and 28 are electrically isolated, as well as the collector electrodes 30 and 32, the different potentials necessary in each section for storing, correlating, erasing, and repetition of this cycle can be applied independently by such circuitry 34 and 36. Thereby, the system can provide very accurate up-to-date error signals 64 for association with automatic guidance of pilotless aircraft, or other appropriate uses, by alternately tracking and storing the information detected in the two sections 16 and 18 of the correlator tube 12.

If the tube 12 is to be operated with deflection or nutation taking place within the drift tubes 38 and 40, thus eliminating nutators 42 and 44, the same sequence of operations will still take effect, except that storage of information onto the respective grids 26 and 28 may not take place during the nutation. In this instance, the nutation will be provided by the deflection circuitry 58 appropriately operating through the coil 58A. In essence an operation of this type will be an open loop, and will not provide continuous correlation, and thus may possibly be subject to some error. In some instances, however, it may be a more practical solution. This technique permits faster cycling than can be accomplished with a single section tube since tracking can be accomplished while the alternate section is being erased.

FIGURE 2 represents the cross sectional configuration of the tube 12, and more particularly shows the semi-cylindrically shaped sections 16 and 18, as well as the respective collector electrodes 30 and 32. Naturally, with the respective storage grids 26 and 28, also taking this semi-circular shape, the optical input information must be adaptable to representation on this type of shape. Thus, a normal PPI scope radar presentation would be quite appropriate. However, it is to be understood that the specific shape of the tube 12 does not form a critical or limiting aspect of the invention, for a tube of any shape enclosing separate storage grids might appropriately meet the bootstrap or continuous correlation principles of the invention.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. An image correlation apparatus which comprises an electron image correlation tube which may receive two separate optical inputs and effect storage thereof electron image patterns, means to present subsequent optical inputs to the tube, means to selectively correlate the subsequently presented optical inputs with the one of the stored electron image patterns to provide correlation signals, means to selectively erase the stored electron image patterns, means to control the correlation, storage, and erase of the electron image patterns whereby one pattern is being correlated while the other is being erased and a new pattern stored, and means to provide image motion compensation to a second image being correlated with the previously stored first image while this same second image is motion compensated and stored for future correlation.

2. A tube according to claim 1 where the respective correlation is used to adjust the means to selectively nutate effecting a closed loop correlation.

3. In a dual section electron image correlation tube the combination of a tubular shaped housing closed at each end and divided substantially into two equal compartments, where one of the closed ends is transparent to light energy, a light sensitive photoemissive cathode adjacent the transparent end in each compartment, a storage mesh in spaced parallel relation to each cathode, an output anode in spaced parallel relation to each storage mesh and being adjacent the other end of the housing, means to focus optical input information selectively onto the respective transparent ends of each compartment of the housing, means to selectively store the optical input information as electron charge patterns onto the storage grid of the respective compartment cathode on which it is focused, means to selectively nutate input information with reference to the information stored on the grid whereby the number of electrons detected by the respective anode represents correlation information, and means to selectively alternate correlation with one compartment and storage with the other to provide an up-to-date accurate correlation at all times.

4. A tube according to claim 3 where the respective correlation information is used to adjust the means to selectively nutate effecting a closed loop correlation.

5. A tube according to claim 3 where the selective nutation is accomplished externally of the tubular shaped housing.

References Cited

UNITED STATES PATENTS

| | | | |
|---|---|---|---|
| 2,202,605 | 5/1940 | Schroter | 178—6.8 |
| 3,102,260 | 8/1963 | Mihelich. | |

ROBERT L. GRIFFIN, Primary Examiner

J. A. ORSINO, Jr., Assistant Examiner

U.S. Cl. X.R.

315—11, 12; 340—149